Feb. 11, 1969 F. A. WITTERN 3,426,670
APPARATUS FOR INDIVIDUALLY PREPARING AND DISPENSING
A CUP OF FRESH BREWED COFFEE
Filed Oct. 23, 1965 Sheet 2 of 6

Fig. 4

INVENTOR
FRANCIS A. WITTERN
BY
ATTORNEY

United States Patent Office 3,426,670
Patented Feb. 11, 1969

3,426,670
APPARATUS FOR INDIVIDUALLY PREPARING AND DISPENSING A CUP OF FRESH BREWED COFFEE
Francis Arthur Wittern, Des Moines, Iowa, assignor to Fawn Engineering Company, Des Moines, Iowa, a corporation of Iowa
Filed Oct. 23, 1965, Ser. No. 502,843
U.S. Cl. 99—298       9 Claims
Int. Cl. A47j 31/057, 31/40

The present invention relates generally to beverage dispensing vending machines and more particularly to an apparatus for individually preparing and dispensing a cup of fresh brewed coffee from a coin operated vending machine.

An object of this invention is to provide an improved liquid dispensing apparatus which automatically and individually prepares and dispenses a predetermined quantity of a freshly brewed liquid beverage.

Another object of this invention is to provide an improved apparatus for preparing a predetermined quantity of a freshly brewed liquid beverage.

Another object of this invention is to provide a beverage brewing and dispensing machine that is selectively operable to dispense a cup of fresh brewed coffee with a quantity of cream and/or sugar.

A further object of this invention is to provide a coffee brewing and dispensing machine wherein an electrically actuated cam control means is operable to automatically control the operation of the machine to sequentially prepare and dispense a cup of freshly percolated coffee.

One other object of this invention is to provide a coffee brewing and dispensing apparatus wherein a liquid container means is operably associated with hot water, granular coffee, pressurized air, and a filter paper supply means which are sequentially actuated to automatically first supply predetermined quantities of water and granular coffee to the container means, then thoroughly mix or brew the coffee in the water by the action of the pressurized air, and finally, discharge the brewed coffee from the container means through the filter paper.

Still a further object of this invention is to provide a coffee brewing and dispensing machine in which fresh percolated coffee, in individual cup quantities, is produced in substantially the same period of time required for cup quantities of instant coffee with the aroma and taste of batch or pot prepared percolated coffee.

Conventional coffee dispensing vending machines now in use operate generally to dispense a cup of coffee from either a previously prepared large quantity of brewed or percolated coffee or an immediately mixed quantity of instant coffee dissolved in water. It is obvious that separately prepared and dispensed fresh percolated coffee is superior in aroma and flavor to the coffee mixtures now dispensed from conventional vending machines.

It is another object of this invention, therefore, to provide a coffee brewing apparatus which is capable of preparing in individual cup quantities a fresh percolated coffee in a time period and of a quality making practical the use thereof in a coin operated vending machine.

Further objects, features and advantages of this invention will become apparent from the following description when taken in connection with the accompanying drawing wherein.

Figures 1, 2, 3:
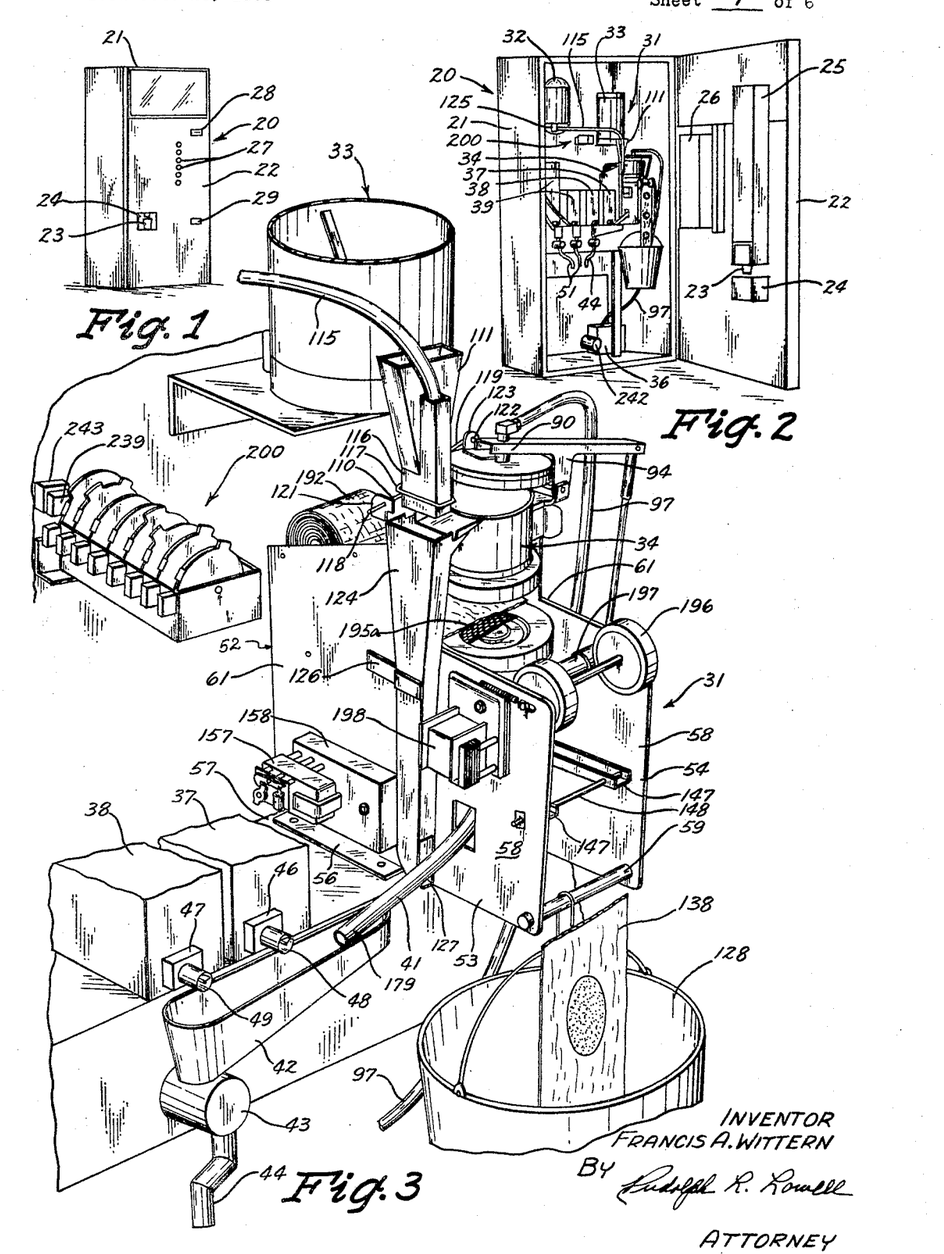
FIG. 1 is a perspective view of a vending machine embodying the coffee brewing and dispensing apparatus of this invention.
FIG. 2 is an enlarged perspective view of the vending machine of FIG. 1, with the front panel thereof open to show the assembly therewith of the coffee brewing apparatus of this invention.
FIG. 3 is an enlarged side perspective view of the coffee brewing apparatus of this invention shown generally in FIG. 2.

Referring to the drawings, there is shown in FIGS. 1 and 2 a vending machine 20 having an upright box type housing 21 with a front access panel or door 22. The inner side of the door 22 carries a dispenser 25 for cups, one of which is indicated at 23, capable of being selectively dropped into a receiving box 24 to collect the liquid or beverage being dispensed. As shown in FIG. 1, the receiving box 24 is open to the front side of the door 22 so that the vended cup is available to the machine operator. A push button assembly and coin mechanism 26 on the rear side of the door includes a series of push buttons 27 projected from the front side of the door, with the number of buttons corresponding to the kind of beverage available in the machine. A coin for presetting the assembly 26 for operation in response to actuation of a push button 27 is insertable within a coin receiving slot 28, with a rejected coin being recoverable at 29.

Located within and suitably supported on the housing 21 is the coffee brewing apparatus of this invention, indicated generally at 31, and including a tank 32 for electrically heated water; a ground coffee dispensing unit 33, a brewing or percolating unit 34, and an air compressing unit 36 for supplying air under pressure to the percolating unit 34 during a percolating operation. Cream and sugar containers for selectively supplying cream and/or sugar to the black or brewed coffee are indicated at 37 and 38 respectively. Also illustrated, but not forming any part of the invention, are containers 39 for additional beverages such as chocolate, soup or the like.

The prepared or black coffee is discharged from the coffee brewing apparatus 31 through a hose or pipe member 41 (FIG. 3) into a downwardly inclined trough 42 having at its lower end a mixing chamber 43 provided with an outlet or discharge pipe 44. Electrically actuated motor operated auger units 46 and 47 are operably associated with the cream and sugar containers 37 and 38, respectively, to selectively dispense, on actuation of corresponding push buttons 27, measured quantities of cream and sugar into the trough 42 through discharge outlets 48 and 49, also respectively.

It is seen, therefore, that the trough member 42 functions to receive and direct predetermined quantities of coffee and sugar and/or cream into the chamber 43 for mixing and eventual discharge as a homogenous mixture through the outlet pipe 44.

As best appears in FIG. 2, the coffee outlet pipe 44, and the outlet pipes 51 from the other beverage containers 39 terminate closely adjacent each other and within what may be termed a common discharge zone. This zone is arranged such that when the door 22 is closed, the terminal ends of the discharge pipes 44 and 51 are located at positions to direct the beverages therefrom into the upper open end of the vending cup 23 in the receiving box 24. In this respect, it is to be understood that the cup dispensing unit 25 is operable on actuation of a selected push button 27 to immediately place or drop a cup 23 into the receiving box 24. As a result, a cup is always in position to receive the beverage being dispensed.

Figure 4:
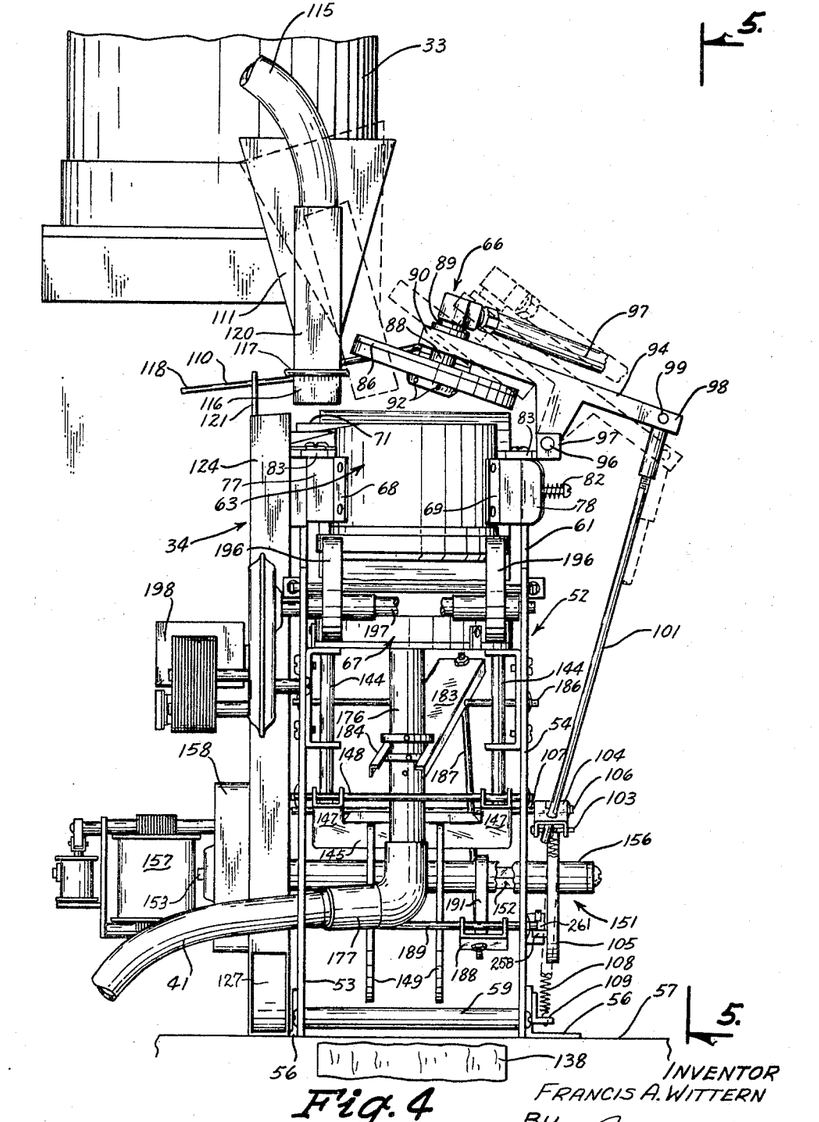
FIG. 4 is an enlarged front elevational view of the coffee brewing apparatus.

As shown in FIGS. 3 and 4, the coffee brewing unit 31 includes a frame 52 having a pair of substantially identical irregular shaped and oppositely arranged upright side walls 53 and 54 of a plate construction. Each side wall or frame member 53 and 54 has a mounting leg or flange 56 adapted to be secured to a horizontal support such as a shelf indicated at 57. For the purpose of convenience, the reduced sections 58 of the frame members 53 and 54 will be referred to as being the forward sections of the frame 52. The frame members 53 and 54 are secured together in a transversely spaced parallel relation by connecting members, one of which is indicated at 59, connected between the front ends of the forward sections 58.

Figures 6, 7, 8:
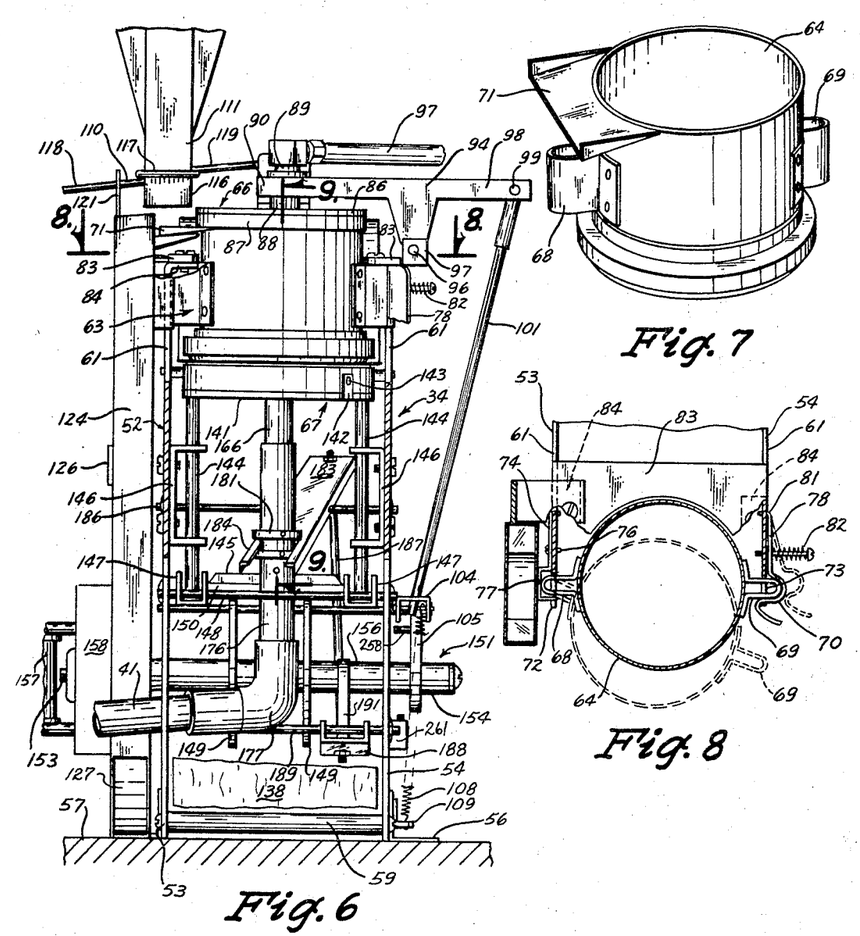
FIG. 6 is a reduced sectional view of the coffee brewing apparatus taken along the line 6—6 in FIG. 5 but wherein a mixing chamber assembly which forms part of the apparatus is shown in a closed position relative to its open position shown in FIG. 5.
FIG. 7 is an enlarged perspective view of a section of the mixing chamber assembly.
FIG. 8 is a detail sectional view taken along line 8—8 in FIG. 6.

Releasably connected to and extended between the side members 53 and 54 and at the forward ends of their rear sections 61 (FIG. 6) is a cup or container 63 which forms part of the brewing unit 34 and includes a center circular sleeve section 64 provided with movable top and bottom cover assemblies 66 and 67, respectively. The opposite open ends of the container center section 64 are selectively fluid sealed by the movable top and bottom cover assemblies 66 and 67, respectively. As shown in FIGS. 7 and 8, the container section 64 has diametrically opposed handle members 68 and 69 of U-shape in transverse cross section secured to and extended outwardly from the outer surface thereof. A drip shield or trough 71 (FIG. 7) is welded to that portion of the upper edge of the container section 64 located above the handle member 68 so as to slope outwardly and downwardly from such upper end portion for a purpose to be hereafter described.

The container section 64 has the handle members 68 and 69 received within cut out sections 72 and 73, respectively, located at the uppermost forward corner portions of the rear sections 61 of the frame members 53 and 54. As shown in FIGS. 6 and 8, a locking plate 74 secured as by screws 76 to the side frame member 53 has a U-shaped portion 77, arranged relative to the cut out section 72, so as to straddle the handle 68 when such handle is in the cut out section 72 in a supported position on the lower edge of the section 72. There is thus formed a receiving pocket for the handle 68, open only at the top and acting to hold the handle 68 against fore and aft movement relative to the side member 53. A second locking plate 78 (FIGS. 5 and 8) corresponding to the cut out section 73 has one end pivotally mounted at 81 on the side frame member 54. A U-shape portion 79 of the locking plate 78 is biased into nesting engagement with the handle member 69 by a bolt and spring assembly 82 secured to the frame member 54.

A horizontal retainer plate 83 secured to and extended between horizontal flanges 84 (FIGS. 6 and 8) of the side member rear sections 61 projects above the cut out sections 72 and 73 to prevent vertical movement of the handle members 68 and 69, respectively, therefrom. It is seen, therefore, that the container section 64 is releasably connected to the side walls 53 and 54 by having the handle members 68 and 69 confined within the cut out sections 72 and 73 by the locking plates 74 and 78, respectively. As shown by dotted lines in FIG. 8, the locking plate 78 is movable outwardly to an open position against the bias of the bolt and spring assembly 82 to permit forward movement of the handle member 69 and subsequent release and removal of the container section 64 for cleaning purposes.

In assembly, and with the locking plate 78 held in open position, as shown in dotted lines in FIG. 8, the handle member 68 is initially received within the socket formed by the cut out section 72, retainer plate 83 and locking plate 74. The container section 64 is then pivotally moved about the handle member 68 to position the handle member 69 within the cut out section 73. The locking plate 78 is then released and moved by the spring assembly 82 into locking engagement with the handle 69.

Figures 9, 10, 16:
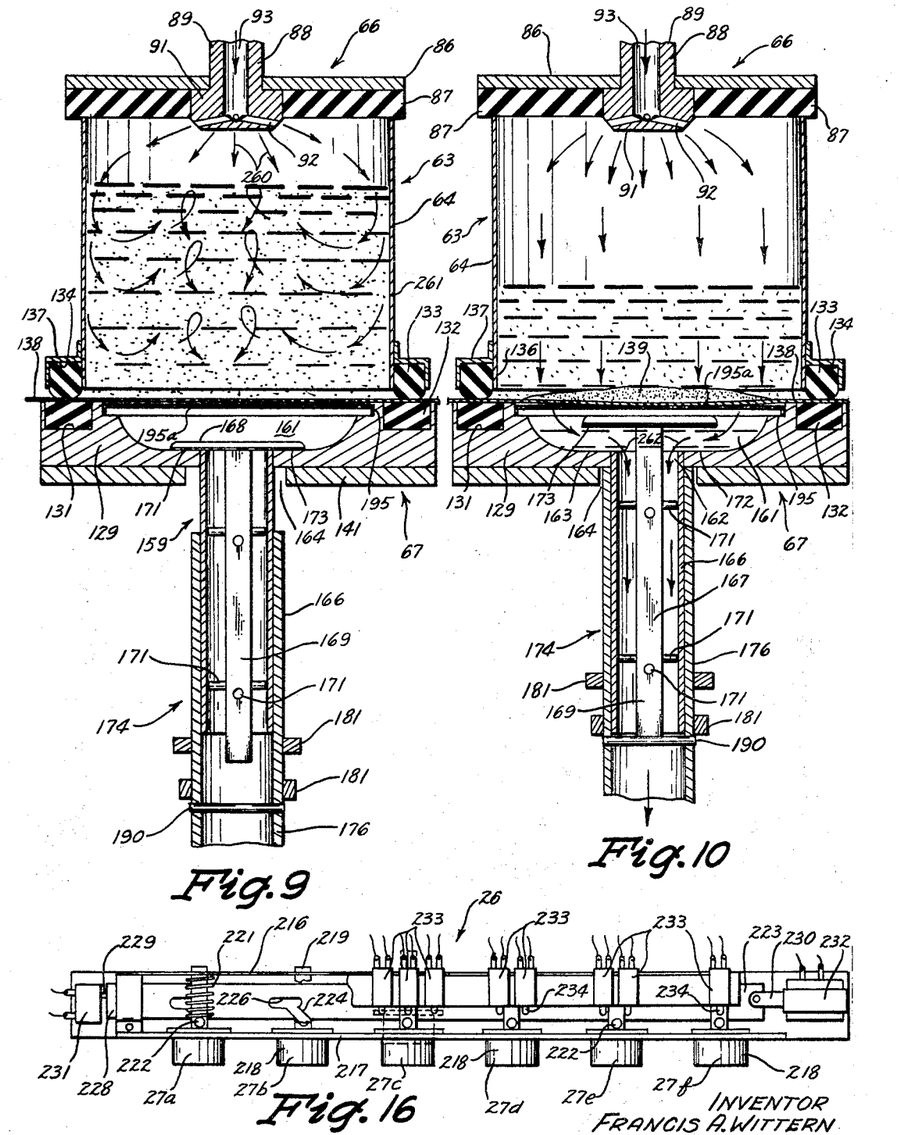
FIG. 9 is an enlarged sectional detail view of the mixing chamber assembly as seen on line 9—9 in FIG. 6 showing the arrangement of the parts thereof for brewing coffee.
FIG. 10 is a view illustrated similarly to FIG. 9 showing the parts of the mixing chamber assembly in changed positions providing for the discharge of the brewed coffee from the mixing chamber assembly.
FIG. 16 is an elevational view of a push button selector assembly for actuating the cam and switch unit shown in FIG. 11.

As shown in FIG. 9 the top cover assembly 66 for the container section 64 includes a cover member 86 of a disc shape having suitably secured to the under side thereof, a fluid sealing gasket 87 which is also of a disc shape. Projected centrally through the cover member 86 and the gasket 87 is a tubular nozzle member 88 having a shank section 89 and a head section 91 formed with a plurality of radially extended and downwardly inclined discharge passages 92. The inner ends of the passages 92 are open to the central bore 93 of the nozzle member 88 and the outer ends thereof are open to the container section 64.

The head section 91 (FIG. 9) is located within the gasket member 87 with its upper side engageable with the under side of the cover member 86, and with the terminal ends of the fluid passages 92 positioned below the under side of the gasket member. As shown in FIGS. 4 and 6 the shank section 89 extends upwardly from the cover member 86 and has suitably secured thereto one end 90 of a lever arm 94 which is pivotally supported at 96, intermediate the ends thereof, on upright tabs or ears 97 integrally formed with the retainer plate 83.

As a result the top cover assembly 66 is pivotally movable upwardly, relative to the pivotal support 96, to its position shown in FIG. 4 providing for the opening of the upper end of the container section 64. Closing of the upper end of the container section 64 takes place on downward pivotal movement of the cover assembly 66 to its position shown in FIG. 6 wherein the gasket member 87, which is of a rubber or like resilient material, is in fluid sealed engagement with the upper peripheral edge or rim of the container section 64.

The upper end of the nozzle member 88 (FIG. 6) above the lever arm 94 is connected to one end of an air line 97, the opposite end of which, as illustrated in FIG. 2, is connected to the outlet of the air compressor unit 36. Air under pressure is thus supplied from the compressor unit 36, and through the air line 97 and passages 92 and 93 of the nozzle member 88 into the container section 64 for a purpose to appear later.

Figure 5:
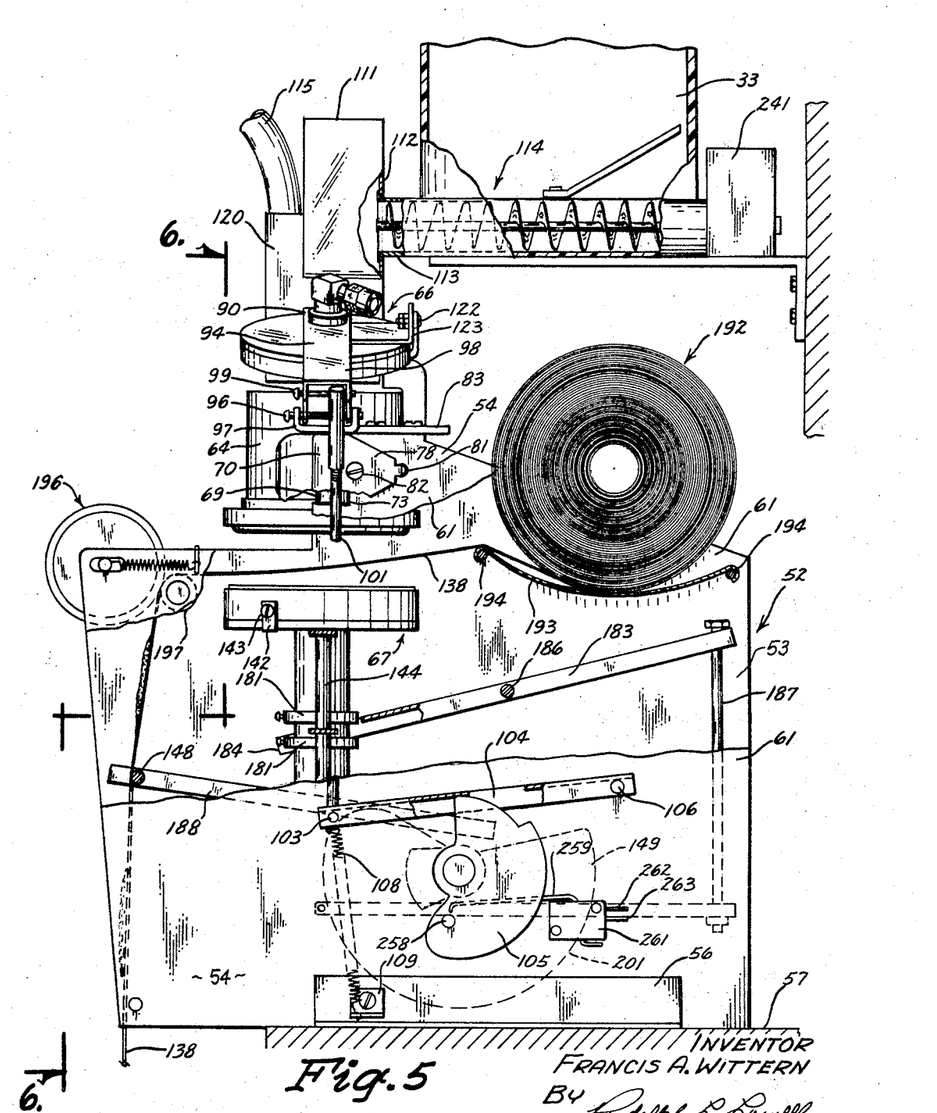
FIG. 5 is a side elevational view of the apparatus as seen along line 5—5 in FIG. 4 with parts broken away and other parts shown in sections for the purpose of clarity.

As shown in FIGS. 4 and 5 the end 98 of the lever arm 94 remote from the top cover assembly 66 is pivotally connected at 99 to the upper end of an actuator rod 101, the lower end of which is pivotally connected at 103 to the forward end of a cam operated arm or cam follower 104 of an inverted channel shape in transverse section. A shaft 106 is extended between and mounted on the frame side members 53 and 54 with an end 107 thereof projected outwardly from the frame member 54. The cam follower 104 is positioned to the outside of the frame member 54 and has its rear end pivotally supported on the projected end 107 of the shaft 106. Actuation of the cam follower 104 is accomplished through a cam 105 comprising part of a cam assembly 151.

A tension spring 108 has one end secured to the forward end of the arm cam follower 104 and its opposite end connected to an ear or tab 109 on the frame side member 54. The spring 108 thus functions to bias the cam follower 104 and actuator rod 101 in a downward direction against the cam 105 whereby the top cover assembly 66 is continuously urged toward its open position shown in FIG. 4. It thus is seen that the top cover assembly 66 is movable to its closed or sealed position with the container section 64 (FIG. 6) against the action of the spring 108.

A combination hot water and coffee discharge chute 111 is movable in response to movement of the top cover assembly 66 to its full and dotted line positions shown in FIG. 4, to provide for the supply of hot water and coffee into the container section 64 when the cover assembly 66 is in an open position. For this purpose the rear wall 112 of the combination chute 111 (FIG. 5) is pivotally supported about the discharge end 113 of a coffee metering mechanism 114, which forms part of the coffeee dispensing unit 33, for pivotal movement transversely of the frame structure 52. Ground coffee from the unit 33 is fed from the outlet 113 of the metering mechanism 114 directly into the chute 111.

Hot water from the tank 32 is supplied through a fluid line 115 into a connector 120 formed as a part of the chute 111 and in fluid registration with the discharge or outlet end 116 of the chute. A valve control mechanism 125, shown in FIG. 2, on the tank 32 and the coffee metering mechanism 114, illustrated as being of an auger type, are electrically operated and selectively controlled to supply metered quantities of water and ground coffee into the chute 111.

The lower or outlet end 116 of the discharge chute 111 is of rectangular shape in transverse section (FIGS. 3 and 4). Mounted about this outlet end 116 is a loop 117 formed from a piece of wire 110 having linear end portions 118 and 119 projected in opposite directions from one end of the loop 117. The wire end portion 118 is guidably supported for axial sliding movement by extension through a guide post 121 extended upwardly from a waste chute member 124 to be later described. The other end portion 119, as appears best in FIG. 5, is pivotally connected at 122 to a bracket 123 on the top cover assembly 66.

The wire actuator rod 110 is operable to rotate the feed chute or funnel 111 counterclockwise, as viewed in FIG. 4, from its full line to dotted line position, in response to movement of the top cover assembly 66 to its fully open position, shown in dotted lines in FIG. 4, so as to place the outlet end 116 of the funnel 111 above the container section 64 whereby to direct coffee and water therefrom into the container section 64. When the top cover assembly 66 is actuated to its closed position, shown in FIG. 6, the combination chute 111 is pivoted to a position substantially above the drip shield 71 whereby any subsequent water or ground coffee flowing therethrough is conveyed into the vertical waste chute 124.

The waste chute 124 (FIG. 3) is secured to the outside of the side frame member 53 by a strap member 126. The lower end of the waste chute 124 has a forwardly facing discharge opening 127 to direct waste material therefrom into a bucket 128 suspended from the transverse connector member 59.

Referring to FIGS. 9 and 10 the lower cover assembly 67 for the container section 64 has a cover member 129 of a disc shape formed in the upper peripheral surface thereof with annular groove 131 for receiving a rubber sealing or gasket member 132 of a ring shape. It is to be noted that the upper surface of the sealing member 132 and the upper surface of the lower cover member 129 lie in a substantially common plane.

The sealing member 132 cooperates with a sealing member 133 which is mounted about the lower end of the container section 64 within an annular groove 134 formed by the lower end portion 136 of the container section and an annular flange 137, of a right angle shape in transverse section, secured about the container section 64. The lower surface of the gasket or sealing member is convexly curved and projects below the end portion 136 so as to directly engage, in a fluid sealing relation, the upper surface of the sealing member 132 when the cover member 129 is moved into position to close the lower end of the container section 64.

Movement of the cover member 129 into and out of a fluid sealing relation with the container section 64 is to provide for the selective movement therebetween of a filter paper 138 of a ribbon form. The filter 138, when the cover member 129 is closed, functions to filter the residual coffee grounds, indicated at 139 in FIG. 10, from the brewed coffee as such coffee is drained from the cup container 63 in a manner to be later described.

Vertical movement of the bottom cover assembly 67 into and out of a fluid sealing relation with the container section 64 is accomplished by means including a circular plate member 141 (FIGS. 6 and 9) secured against the underside of the cover member 129 by means of tabs 142 extended upwardly from the periphery of the plate member 141 and attached by screws 143 to the peripheral surface of the cover member 129. Suitably secured to and depending from the plate member 141 (FIG. 6) in diametrically opposite positions is a pair of actuator posts 144, which are guidably supported for vertical movement in corresponding guide ways 146 mounted on the inner surfaces of the side frame members 53 and 54.

The lower ends of the actuator posts 144 are in riding engagement with a pivotal cam actuated lever 145 (FIGS. 4 and 6). This lever 145, in plan view, is of a U-shape and is located between the frame members 53 and 54 with its leg sections 147 extended forwardly so as to be engageable with corresponding ones of the actuator posts 144. The front ends of the leg sections 147 are pivotally supported on a shaft 148 mounted on and extended between the side frame members 53 and 54. Thus in response to pivotal movement of the cam actuated lever 145 about the shaft 148, the actuating posts 144 are vertically operated to provide for the movement of the bottom cover assembly 67 into and out of a fluid sealing relation with the lower end of the container section 64.

The lever 145 is actuated by a pair of like cams 149 (FIGS. 4 and 6) corresponding to the leg sections 147, with the cams 149 being in riding engagement with the under side of the base section 150 of the lever arm 145. The cams 149 form part of the cam assembly 151 that includes a shaft 152 of a square shape in transverse section supported on the side frame members 53 and 54 with its opposite end portions 153 and 154 projected outwardly from the frame members 53 and 54, respectively. Mounted about the shaft 152 are spacing collars or sleeves 156 for maintaining the cams 149 in fixed axially spaced positions thereon. Rotation of the cam assembly 151 is accomplished by an electric motor 157 operatively connected in a driven relation with the shaft end portion 153 through a speed reduction unit 158.

To remove or release the brewed coffee from the cup container 63, there is provided a valve structure 159 which is formed as a part of the lower cover assembly 67 (FIGS. 9 and 10). The top surface of the lower cover member 129 has a central circular cavity 161 with an opening 162 in a flat bottom wall 163. The opening 162 is in axial alignment with a larger opening 164 formed in the plate member 141. An upright tubular valve guide 166 has its upper end positioned within the openings 162 and 164 for securement to the plate member 129 as by welding. It will be seen that the top end face of the valve guide 166 is in the plane of the cavity bottom wall 163.

Guidably supported for vertical movement within the guide sleeve 166 is a valve member 167 having a head section 168 and a stem section 169. Cross pins 171 inserted through the valve stem section 169 have their ends in contact engagement with the inner peripheral surface of the guide sleeve 166 to maintain the valve stem 169 in a centered relation within the guide sleeve. The valve head section 168 has a flat seat portion 171 adapted for seating engagement in a fluid sealing relation with a valve seat 172 formed about the opening 162 by the cavity bottom wall 163. A disc shape rubber gasket 173 may be applied to the seat portion 171 to assure a positive closing of the opening 162 by the valve member 167.

In order to move the valve member 167 into and out of a closing position with the opening 162 there is provided a combination outlet pipe and actuator structure 174 comprised of a tubular pipe 176 mounted in a telescoping relation about the valve guide 166 for axial movement relative thereto. The lower end of the pipe 176 is connected through an elbow connection 177 (FIG. 4) with the flexible tube 41 which extends through the side frame member 53 with its outlet end 179 positioned in the trough member 42 (FIG. 3).

Secured about the pipe 176 (FIG. 9) intermediate the ends thereof, are a pair of axially spaced stop collars 181. A pivoted lever arm 183 (FIGS. 4 and 6) has a forward connector portion 184 of U-shape arranged in a straddling relation with the pipe 176 and between the collars 181 whereby to raise the valve member 167 from its seated position and open the port or opening 162 on upward pivotal movement of the connector portion 184.

The lever arm 183 is pivotally supported intermediate the ends thereof on a shaft 186 extended between and supported on the side frame members 53 and 54. The end of the arm 183, opposite the connector portion 184 is movably connected to the upper end of a connecting rod 187, the lower end of which is connected to the rear end of a pivoted arm 188. At its forward end the arm 188 is pivotally supported on a shaft 189 extended between and carried on the side frame members 53 and 54. A cam 191, forming part of the cam assembly 151, is engageable with the under side of the arm 188 to provide for pivotal movement thereof to raise and lower the valve structure 159 through the connecting rod 187 and lever arm 183.

As shown in FIGS. 9 and 10, a pin 190 is mounted through and diametrically of the pipe 176 at a position below the lower one of the stop collars 181. When the valve structure 159 is in a lowered position (FIG. 9) and the cover assembly 67 is closed with the valve member 167 seated relative to the discharge port 162, the pin 190 is below and out of engagement with the lower end of the valve stem 167. On upward movement of the pipe member 176, and with the lower cover assembly 67 in its closed position, the pin 190 is moved into abutting engagement with the valve stem 167 whereby the valve head 168 is moved upwardly to open the discharge port 162.

Brewed coffee is thus permitted to flow from the cup container 63, through the opening 162, valve guide 166, pipe member 176 and tube 41 into the trough member 42 for flow into the vending cup 23. It is obvious that on downward movement of the pipe or sleeve member 176 relative to the valve guide 166 that the valve member 167 is returned to a seated position by the action of gravity.

As previously mentioned the lower cover assembly 67 is moved into and out of a fluid sealing relation with the lower end of the container section 64 to provide for the movement therebetween of a filter paper 138 of ribbon form. Referring to FIG. 5, a roll 192 of the filter paper is supported on a plate or tray member 193 concavely curved in a direction longitudinally of the frame 52 and having the ends thereof secured to pins 194 extended between and mounted on the frame side members 53 and 54.

The filter paper 138 is unrolled forwardly from the underside of the roll 192, over the forward end of the supporting tray 193, and between the lower cover assembly 67 and the container section 64 for travel over a drive roller assembly 196 located between and rotatably supported on the side frame members 53 and 54 adjacent the front ends thereof. From the drive roller assembly 196 (FIG. 3) the paper travels downwardly across the front of the brewing assembly 31 for deposit into the waste container 128. An idler or follower roller assembly 197, rotatably supported on the side frame members 53 and 54, is continuously biased into frictional engagement with the drive roller assembly 196 to assure a positive linear movement of the filter paper 138 in response to a rotation of the drive roller assembly 196.

The follower roller assembly 197 is positioned upwardly and forwardly of the drive roller assembly 196 and only the outer edges of the filter paper 138 are engaged between the roller assemblies 196 and 197. The filtered out residual coffee grounds 139, while adhering to the filter paper 138 are thus permitted to pass freely between the roller assemblies 196 and 197.

The cavity 161 (FIGS. 9 and 10) is covered by a screen 195a of a circular shape positioned within an annular recess 195 formed about the upper peripheral edge of the cavity so the screen lies below the upper surface of the cover member 129. The screen 195a, along with permitting flow of the brewed coffee therethrough, functions to support the filter 138 above the cavity 161.

The filter paper 138 (FIG. 3) is moved intermittently in response to energization of an electric motor 198 operatively associated in a driving relation with the roller assembly 196. The motor 198 is selectively operable, when the bottom cover assembly 67 is in the open position shown in FIG. 5, to move the filter paper 138 forwardly between the drive roller assembly 196 and follower roller assembly 197 so as to replace a used portion of the filter paper 138 with an unused portion. It is further noted that forward movement of the filter paper 138 has a tendency to pull the paper roll 192 forwardly on the plate member 193. However, this tendency is counteracted by the forward unwinding of the roll 192 from the underside thereof and the location of the roll within the depression or concavity formed by the plate member 193.

As thus far described, it is seen that the coffee brewing assembly 31 includes a cup container 63 having top and bottom cover assemblies 66 and 67, respectively, movable into and out of container forming and closing positions, and a valve structure 167 for controlling the flow of the brewed coffee from the container 63, all of which are selectively operated in response to actuation of the cam assembly 151. The supply of filter paper 138, water from the tank 32, ground coffee from the coffee dispensing unit 33, and sugar and cream from the containers 37 and 38, respectively, are all under the control of corresponding electrical motor units the operation of which is controlled by a cam and switch unit 200 (FIGS. 3 and 11) the actuation of which is in a predetermined timed and sequential pattern relative to the cam assembly 151.

Referring to FIG. 4, the cam assembly 151 is seen to include the pair of cams 149 for operating the lower cover assembly 67, the cam 191 which controls the operation of the valve structure 167, and the cam 105 for controlling the movement of the top cover assembly 66. All of these cams are mounted on the shaft 152 against relative angular or circumferential movement, and are positively maintained against axial movement by the spacing collars or sleeves 156. The reduction unit 158 operates to convert a high speed low torque input from the motor 157 into a low speed high torque output for the shaft 152. Operation of the motor 157 to rotate the shaft 152 through one complete revolution moves the cams of the cam assembly 151 through one complete coffee brewing cycle.

Figures 12, 13, 14, 15, 17:
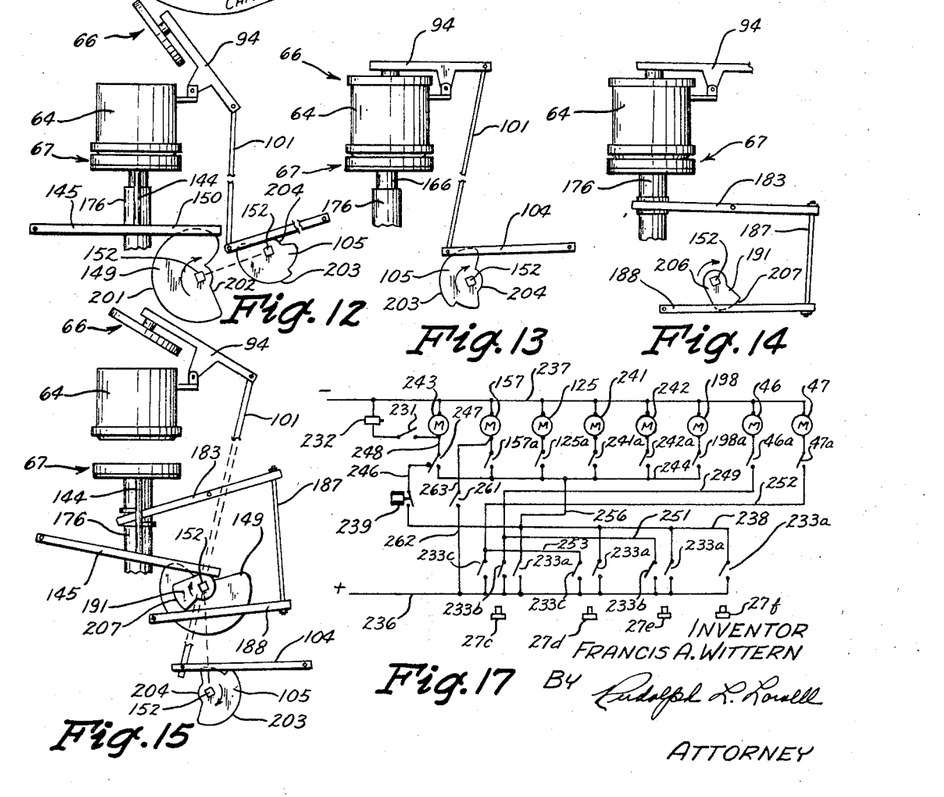
FIGS. 12–15, inclusive, are schematic illustrations of the mixing chamber assembly, showing the parts thereof in changed operating positions and with a top cover assembly moved 90° from its normal position for the purpose of clarity.
FIG. 17 is an electrical diagram of the control circuit for the coffee brewing apparatus.

As shown in FIGS. 5 and 12, the cams 149 for the bottom cover assembly 67 have a high side 201 of a circular curvature in excess of one hundred and eighty degrees, with a cut away portion or low side 202. On clockwise rotation of the cams 149, as viewed in FIGS. 5 and 12, the high sides 201 engage the lever 145 whereby to raise the actuator rods 144 to move and hold the lower cover assembly 67 in a closed fluid sealed relation with the container section 64. On continued clockwise rotation of the cams 149 and location of the low side 202 opposite the lever 145 (FIG. 15) the lower cover assembly 67 drops away from the container section under the action of gravity.

Referring to FIG. 13, the cam 105 for the top cover assembly 66 has a high side 203 of a circular shape and a low side 204 of an irregular configuration. The assembly 66 is held in a closed relation with the container section when the high side 203 is in engagement with the arm 104, and is movable by the action of the spring 108 to an open position (FIG. 15) when the arm 104 is engaged by the low side 204.

The cam 191 (FIG. 14) for the valve structure 167 is of a substantially rectangular shape and mounted adjacent one end 206 thereof on the shaft 152, which constitutes a low side, with the opposite end 207 thereof forming a high side. When the arm 188 is engaged by the high side 207, the valve structure is held in an open position relative to the container discharge port 162, and with this engagement taking place only when the lower cover assembly 67 is in a closed relation with the container section 64. In other words, the engagement of the arm 188 by the cam high side 207 functions to hold the valve structure 167 open to permit discharge of the brewed coffee from the container 63. On disengagement of the pin 190 (FIG. 9) from the valve stem 169, the valve structure drops into a seated relation with the cover member 129 under the action of gravity.

As shown in FIGS. 5 and 15, the cams 105, 149 and 191 are angularly arranged relative to each other on the shaft 152 so that the valve structure 167, top cover assembly 66 and bottom cover assembly 67 are actuated in a proper predetermined sequential order on energization of the cam motor 158.

In the automatic control system of the vending machine 20, the push button assembly 26 is electrically connected to the switch and cam unit 200 (FIG. 3) which controls the cyclic operation of the coffee brewing unit 31. The control buttons 27A and 27B (FIG. 16) are operable to selectively dispense beverage from the containers 39. The remaining control or push buttons 27c–27f, inclusive, are singly operable to provide for the dispensing, respectively, of a cup of coffee with cream and sugar, coffee with cream, coffee with sugar, or black coffee.

The push button assembly 26 includes a frame having front and rear members 216 and 217, respectively. Each control or push button is of an individual spring pressed type construction slidably supported in the walls 216 and 217 and including a button member 218 and stem section 219. A compression spring 221 is mounted about the stem section 219 between the rear frame member 217 and a pin 222 extended transversely of the stem section adjacent a button member 218. The spring acts to bias the button member 218 to a position projected forwardly of the front frame member 216.

Arranged between the front and rear frame members 216 and 217 and supported for slidable movement longitudinally thereof is a latch bar 223 formed with a series of transversely inclined slots or notches 224 corresponding to the push buttons 27. The terminal end of each slot 224 is open to a longitudinally extended opening 226. One end 228 of the latch bar 223 is engageable with an actuator 229 of a normally open switch 231. The switch 231 controls the operation of a solenoid 232 that has its plunger 230 connected to the opposite end of the latch bar.

On depression of a button member 218, the pin 222 thereof is moved within its associated inclined slot 224 whereby to move the latch bar 223 toward the right, as viewed in FIG. 16, to release the actuator 229 of the normally open switch 231. On closing of the switch 231 to energize the solenoid 232, the latch bar is pulled toward the right and held by the solenoid to locate the pin 222 of the depressed button member 218 within its corresponding elongated opening 226. With the latch bar 223 in such position, the remaining button members 218 are held against being depressed by virtue of the pins 222 thereof being out of alignment with their corresponding notches 224.

The latch bar 223 thus functions, after a button member 218 has been depressed, to lock all of the remaining button members against operation. This condition will continue until the solenoid 232 is de-energized and the latch bar 223 returned to its rest position shown in FIG. 16. It is to be understood that all of the push buttons 27 are similar in construction and operation and that like numbers, therefore, have been used to indicate like parts.

Each button member 218 is operatively associated with one or more identical normally open switches 233 mounted on the rear frame member 217. Each switch 233 has a spring pressed actuator 234 engageable with a corresponding button member 218. The number of switches 233 associated with a button member 218 is dependent upon the coffee mixtures. Thus the push button indicated at 27c to provide for the dispensing of coffee with cream and sugar has three switches 233; push button 27d for coffee with cream and push button 27e for coffee with sugar each have two of the switches 233. Push button 27f for black coffee only includes a single switch 233.

It is thus seen that a button member 218, on being depressed, moves the latch bar 223 to its locking position providing for a non-actuation of the remaining buttons concurrently with closing the one or more switches 233 associated therewith to energize the circuits controlled by such switches. The actuated switches 233 will remain closed and their respective circuits energized until the latch bar 223 is released for return movement to its normal or rest position shown in FIG. 16. As a result it is not necessary to hold a button member 218 in a depressed position for the duration of the vending cycle.

In the circuit diagram of FIG. 17, each push button unit 27c–27f, inclusive, is illustrated with its associated switch units, the push button units 27a and 27b being eliminated since they do not form a part of the present invention. This circuit is seen to include a pair of lead lines 236 and 237 suitably connected with a 110 volt source of supply. All of the switch units indicated as 233a are connected in parallel between the lead line 236 and a conductor 238 connected to a relay 239 forming part of the coin receiving mechanism in the push button assembly 26.

The electrical motors 157 and 198 for the cam assembly 152 and filter paper 138, respectively; and the motors 241, 242 and 125 for the ground coffee metering mechanism 114, air compressor unit 26, and hot water container 32, also respectively, are all connected in parallel between the lead line 237 and a conductor 244. A motor 243 for the switch and cam unit 200 is connectible to the lead line 237 and by a conductor 248 to the conductor 244 through a two way switch unit 247 which is normally closed with a conductor 246 to the coin relay 239. The solenoid 232 for the latch bar 223 and the solenoid control switch 231 are connected in series between the lead line 237 and the conductor 248.

The motor 46 for the sugar container 37 is connected to the lead line 237 and through conductors 249 and 251 to the two switch units indicated as 233b forming part of the push button assemblies 27c and 27e. The motor 47 for the cream container 38 is connected to the lead line line 237 and through conductors 252 and 253 to the two switch units indicated as 233c and forming part of the push button assemblies 27c and 27d. The control switches for controlling the operation of the motors 243, 157, 125, 241, 242, 198, 46 and 47 are indicated at 247, 157a, 125a, 241a, 242a, 198a, 46a and 47a, respectively.

Since the operation of the coffee brewing unit 31 is the same on actuation of any one of the push button assemblies 27c–27f, inclusive, only the operation resulting from actuation of the push button assembly 27c providing for the brewing and dispensing of coffee with milk and sugar will, therefore, be described in detail.

Assume the coffee brewing unit 31 to be in its rest or inactive position shown in FIG. 3 wherein the top and bottom cover assemblies 66 and 67, respectively, are in open positions relative to the container section 64, the chute 111 is disposed above the waste chute 124, and an unused portion of the filter paper 138 is arranged between the container section 64 and the bottom cover assembly 67. In this rest position the latch bar 223 is in the position thereof shown in FIG. 16, and the cams 105, 149, and 191 in the cam assembly 151 are in their relative positions shown in FIG. 5.

The cam and switch unit 200 (FIGS. 3 and 11) has all of the control switches 157a, 125a, 241a, 242a, 198a, 46a and 47a thereof in open positions with the two way control switch 247 being closed relative to the normally open coin relay 239 and open relative to the conductor 244. The cams 243b, 157b, 125b, 241b, 242b, 198b, 46b and 47b in the unit 200 and corresponding to the switches 243, 157a, 125a, 241a, 242a, 198a, 46a and 47a, respectively, are in their relative positions shown in FIGS. 3 and 11 for the rest position of the coffee brewing structure 31.

On insertion of a coin in the receiving slot 28 (FIG. 1) the coin relay 239 (FIG. 17) is conditioned to connect the motor 243 of the cam and switch unit 200 with the conductor 238. When the button member 218 of the assembly 27c is depressed, the latch bar 223 is operated, as previously described in connection with FIG. 16, to close the switch 231 and energize the solenoid 232 whereby to lock the remaining button members 218 against actuation. Concurrently with this operation of the latch bar 223, the depression of the actuated control button 218 provides for the simultaneous closing of all three switches 233a, 233b and 233c of the push button assembly 27c.

On closing of the switch 233a, the lead line 236 is connected to the conductor 238 and simultaneously to conductor 244 through a bridge conductor 256. The circuit of the motor 243 is initially closed through the coin relay 239 and switch 247 to rotate the cam and switch unit 200, after which the control switch 247 is actuated and the energization of the motor 243 is continued through the connection of conductors 244 and 248 by the switch 247 for continued operation of the cam and switch unit 200. Simultaneously with actuation of the control switch 247, the coin relay 239 is de-energized and actuated to its normally open position. Closing of the switches 233b and 233c of the push button assembly 27c connects the lead line 236 with the conductors 249 and 252, respectively.

Figure 11:
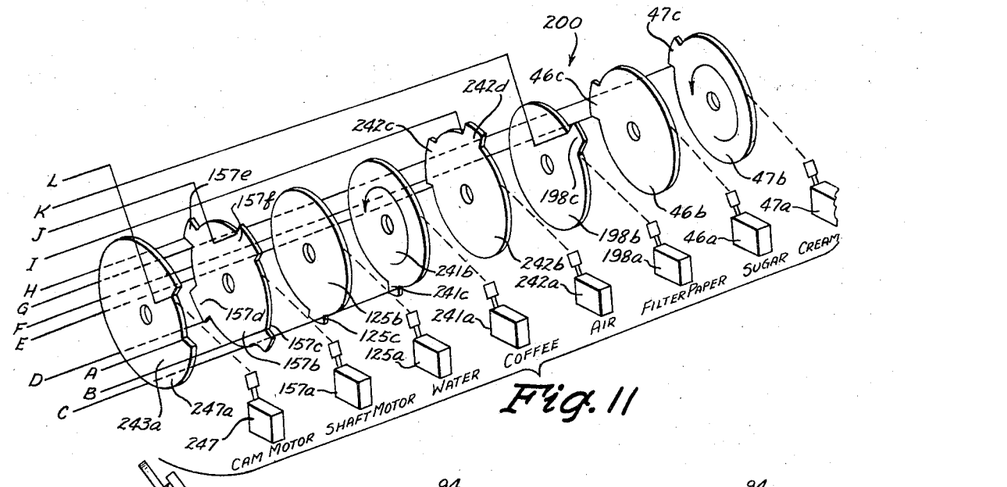
FIG. 11 is an enlarged diagrammatic exploded perspective view of a cam and switch unit that forms a part of the control mechanism for the coffee brewing apparatus.

On energization of the motor 243, the cams of the cam and switch unit 200 are rotated in a counterclockwise direction, as viewed in FIG. 11, through positions indicated at A–L, inclusive, providing for a predetermined actuation of the control switches to control the operation of the coffee brewing unit 31 through a complete brewing cycle. As the positions A–L are also indicative of the operational stages of the brewing cycle, each position and the resultant movement of the component parts of the brewing unit 31 will be described in detail. In the description of the positions A–L, inclusive, it is to be understood that they refer to rotated positions of the cams in the unit 200 opposite the control switches corresponding thereto.

At position A, the control switch 247 is actuated by the cam projection 247a for continued energization of the motor 243 as previously described.

In position B, the control switch 157a is actuated to close the circuit of the motor 157 for the cam assembly 151 for a period of time proportional to the arcuate length of the cam projection 157c. During this time period, the cams 149 are rotated from their positions in FIG. 15 to their positions shown in FIG. 12 to provide for the lower cover assembly 67 being moved to and held aganst the bottom of the container section 64 with an unused portion of the filter paper 138 clamped therebetween. It is to be noted that the valve structure 167 is in a seated position with the lower cover member 129. Concurrently the cam 105 provides for the movement of the upper cover assembly 66 to a fully open position relative to the container section 64 to its dotted line position in FIG. 4. In response to this movement of the upper cover assembly 66, the outlet 116 of the hot water and ground coffee chute 111 is located above the open upper end of the container section 64.

At position C, the control switches 125a and 241a are actuated by the cam projections 125c and 241c, to close the circuits for the motors 125 and 241, all respectively, to provide for predetermined quantities of hot water and ground coffee being supplied into the chute 111 for discharge into the cup container 23. The cam assembly 151 is not rotated during this operation.

In position D, the control switch 157a is again actuated by the cam projection 157d whereby the cam assembly 151 is rotated to operate the cam 105 to move the upper cover assembly 66 to its position in FIG. 13. In response to such movement of the upper cover assembly the outlet end 116 of the chute 111 is moved over the drip shield 71 and discharge chute 124.

At position E, in which the cover assemblies 66 and 67 are held closed with the container section 64, the control switch 242a is actuated by the cam projection 242c to energize the air compressor motor 242 whereby air under pressure is supplied into the closed container section 64 through the nozzle member 88 and discharge passages 92. As shown in FIG. 9, air, under a pressure of about five pounds per square inch, is directed downwardly and radially of the container section 64, as indicated by the arrows 260, to create turbulence of the water therein, as indicated by the arrows 261 whereby to thoroughly agitate the water for mixing with the coffee grounds shown in FIG. 9 dispersed within the water.

In position F, and while the coffee is brewing within the container 63, the control switch 46a is actuated by the cam projection 46c to energize the electrical unit 46 to discharge a predetermined quantity of sugar into the trough 42 after which, and at position G, the control switch 47a is actuated by the cam projection 47c to energize the dispensing unit 47 to discharge a measured amount of powdered cream into the trough 42.

At position H, the control switch 157a is actuated for the third time in the brewing cycle by the cam projection 157e to energize the motor 157 for rotation of the cam 191 to provide for the movement of the valve member 167 to its open position shown in FIGS. 10 and 14. The brewed coffee is thus permitted to flow through the filter paper 138, valve guide 156, pipe 176 and hose 41 into the trough 42 to mix with the cream and sugar previously supplied thereto for discharge through the pipe 44 into the vending cup 23. During the operation of position H, the air supply to the container 63 is stopped to facilitate opening of the valve member 167 along with slowing down the flow of coffee through the residual grounds 139.

In position I, the control switch 242a is actuated a second time by the cam projection 242d to supply air under pressure into the container section 64 for flow downwardly thereof and through the discharge port 162, as indicated by the arrows 262 in FIG. 10, to accelerate the filtering of the residual coffee grounds. At the same time the residual grounds are compacted and dried on the filter paper 138 by the action of the air flow thereon, so as to adhere to the filter somewhat as a plaster.

At position J, the control switch 157a is actuated the final time by the cam projection 157f for energizing the motor 157. During this final energization of the motor 157, all of the cams 105, 149 and 191 of the cam assembly 151 are movable to their original starting positions of FIGS. 5 and 15. In this movement the cams 105 and 149 are operative to open the upper and lower cover assemblies 66 and 67, respectively.

In position K, the control switch 198a is actuated by the cam projection 198c to energize the motor 198 for the filter paper to replace the used portion of the filter paper 138 with a fresh portion. As shown in FIG. 3, the used portions of the filter paper are progressively fed forwardly and downwardly for deposit in the waste container 128.

In the final position L, the control switch 247 is actuated to the initial cycle starting position shown in FIG. 17 to open the operation circuit for the motor 243 of the cam and switch unit 200. Concurrently, the solenoid 232 and switch 231 are de-energized to release the latch bar 223 with movement of the push button 27c to the inactive position to complete the brewing cycle and return the coffee brewing unit 31 to the idle or initial starting position. It is obvious that a selected one of the push button assemblies 27c–27f, inclusive, can now be activated after insertion of a coin into the receiving slot 28 to prepare and dispense a freshly percolated cup of coffee either plain or in combination with sugar and/or cream.

During the final actuation of the control switch 157a (position J), a laterally extended pin 258 secured to the inner surface of the moving cam 105 contacts an actuator arm 259 to close a normally open override switch 261 mounted on the side wall 54 (FIG. 5). The override switch 261 is connected by conductors 262 and 263 to the conductor 236 and motor 157, respectively. The switch 261 is held closed after de-energization of the switch 157a for continued energization of motor 157 with resultant rotation of the cam assembly 151 until the arm 259 is released from the pin 258 to open the switch 261 and stop the cam assembly 151. It is seen, therefore, that the override switch 261 functions to stop the cam assembly 151 in a predetermined rotational relationship relative to the cam and switch unit 200 so that the coffee brewing unit 31 returns to the identical inactive or idle position to assure that each new brewing cycle is started in a proper timed relationship.

While there have been shown, described, and pointed out the fundamental novel features of the invention as applied to the preferred embodiment, it will be understood that various omissions, substitutes and changes in form may be made by those skilled in the art without departing from the spirit of the invention. It is intended to be limited only as indicated by the following claims.

I claim:
1. Apparatus for automatically preparing and dispensing a freshly brewed cup of coffee including:
   (a) frame means,
   (b) means on said frame means forming a closed cup container including a central section having upper and lower ends, and including further,
   (c) an upper cover assembly and a lower cover assembly for opening and closing, respectively, the upper and lower ends of said central section,
   (d) means movably supporting said cover assemblies on said frame for independent movement to open and closed positions relative to said central section,
   (e) an air inlet means on said upper cover assembly open to said central section,
   (f) a fluid outlet means on said lower cover assembly,
   (g) valve means for opening and closing said outlet means,
   (h) filter means of ribbon type movably supported on said frame means for movement between said lower cover assembly and the lower end of said central section when the lower cover assembly is in an open position,
   (i) a heated water supply means,
   (j) a ground coffee supply means,
   (k) a pressurized air supply means, and
   (l) means for controlling all of said supply means and said valve means, and for moving said two cover assemblies and filter means in a predetermined sequence whereby water and coffee, when the lower cover assembly is closed and said upper cover is opened, are admitted into the upper end of said center section and when said upper cover assembly is closed, pressurized air is admitted to the center section for a predetermined time period after which period, the outlet means is opened and the brewed coffee is moved through the filter means by the pressurized air.

2. The apparatus according to claim 1, in which said control means comprises:
   (a) a push button mechanism including a plurality of push buttons,
   (b) a cam and switch unit having a plurality of rotatable cams, and a corresponding plurality of stationary switch members, each cam being engageable with a corresponding switch member to provide for a periodic predetermined actuation thereof,
   (c) motor means drivably connected to said cam plates for rotation thereof,
   (d) a plurality of switch units corresponding to said cams and actuated by said push buttons,
   (e) first circuit means interconnecting said switch units, switch members and motor means, and
   (f) second circuit means interconnecting said switch members to all of said supply means, filter means and valve means whereby actuation of a push button operates said motor means to rotate the cam and switch unit for automatic and sequential actuation of the switch members.

3. Apparatus for preparing and dispensing freshly brewed coffee including:
   (a) a frame means
   (b) a container for hot water and ground coffee having a top cover means with an air inlet open to said container,
   (c) a movable lower cover means for said container having a closable fluid outlet,
   (d) means movably supporting said lower cover means for movement to open and closed positions relative to said container,
   (e) filter means of ribbon type movably supported on said frame means for movement across said outlet and between said container and lower cover means when said lower cover means is in a container opening position, and
   (f) means for admitting air under pressure to said air inlet, when said lower cover means is closed, to agitate and mix the hot water and coffee grounds in said container, and when said outlet is open, to move the brewed coffee through said outlet.

4. Apparatus for preparing and dispensing freshly brewed coffee including:
   (a) frame means
   (b) a container for hot water and ground coffee having a top cover means with an air inlet open to said container,
   (c) a movable lower cover means for said container having a fluid outlet,
   (d) means on said lower cover means for opening and closing said fluid outlet, (e) filter means on said lower cover means for filtering coffee grounds from the brewed coffee discharged through said fluid outlet,
(f) means movably supporting said lower cover means on said frame means for movement to open and closed positions relative to said container,
(g) means for admitting air under pressure to said air inlet, when said lower cover means and fluid outlet are closed, to agitate and mix the hot water and coffee grounds in said container and, when said outlet is open, to flow with the brewed coffee through said filter means, and
(h) means for disposing of the residual coffee grounds on said filter means after the container has been emptied of brewed coffee and the lower cover means moved to an open position.

5. Apparatus for preparing and dispensing freshly brewed coffee including:
(a) frame means
(b) a container for hot water and coffee grounds having a closed upper end and a movable cover means for the lower end thereof,
(c) air inlet means at the upper end of said container,
(d) a liquid outlet for the container formed in said cover means,
(e) means movably supporting said cover means on said frame means for movement into and out of a closing relation with the lower end of said container,
(f) means on said cover means for opening and closing said liquid outlet,
(g) means for filtering the liquid discharged from said container for flow through said outlet,
(h) means for admitting air under pressure to said inlet means, when said cover means and liquid outlet are closed, to disperse the coffee grounds throughout the hot water in said container, and when said outlet is open, to flow with the brewed coffee through said filter means, and
(i) means for disposing of the filtered residual coffee grounds when said cover means is open.

6. Apparatus for automatically preparing and dispensing a freshly brewed cup of coffee including:
(a) frame means
(b) means forming a cup container for hot water and ground coffee including a center section open at the upper and lower ends thereof,
(c) an upper movable cover means for the upper end of said center section movably supported on said frame means for movement to open and closed positions relative to said upper end,
(d) a lower movable cover means for the lower end of said center section movably supported on the frame means for movement to open and closed positions relative to said lower end,
(e) an air inlet means at the upper end of said cup container,
(f) a liquid outlet in said lower cover means,
(g) means for opening and closing said liquid outlet,
(h) means on said lower cover means for filtering the liquid passing through said outlet,
(i) means for supplying predetermined quantities of hot water and ground coffee into said container when the upper cover means is open,
(j) means for supplying air under pressure to said inlet, when said upper cover means and lower cover means are closed, to agitate the hot water and coffee grounds in said container, and, when said liquid outlet is open, to exert a pressure on the brewed coffee and to flow therewith through said filtering means and outlet, and
(k) means, when the lower cover means is open, for removing the residual coffee grounds from said container.

7. A liquid dispensing device for preparing and dispensing a cup of freshly brewed coffee comprising:
(a) frame means,
(b) means forming a cup container mounted on said frame means and having a bottom outlet port,
(c) means for supplying predetermined quantities of heated water and ground coffee into said container,
(d) means for agitating and mixing the heated water and ground coffee in said container for a predetermined time period,
(e) means for opening and closing said outlet port,
(f) means for filtering the liquid flowing through said outlet port, and
(g) control means operable to sequentially provide for the admission of the predetermined amounts of heated water and coffee grounds to said container, agitation of the water and coffee grounds for the predetermined time period and opening of the outlet port to discharge the brewed coffee from said container through said filtering means.

8. The liquid dispensing device according to claim 7, in which:
(a) said filter means includes a filter member of ribbon type,
(b) means supporting saaid filter paper on said frame means for movement transversely of said container at a position adjacent to and above said outlet port, and
(c) means for operating said filter means operatively associated with said control means to provide for a portion of said filter member being moved transversely of said container after the brewed coffee has been discharged from the container.

9. The liquid dispensing device according to claim 7, in which:
(a) said agitating means includes an air nozzle member at the top of said container and open thereto, and
(b) means for supplying air under pressure to said nozzle member.

References Cited

UNITED STATES PATENTS

| | | | |
|---|---|---|---|
| 2,778,739 | 1/1957 | Rodth | 99—295 X |
| 3,120,440 | 2/1964 | Ross | 99—298 X |
| 3,143,955 | 8/1964 | Rockwell | 99—289 |
| 3,203,340 | 8/1965 | Totten | 99—289 |

ROBERT W. JENKINS, *Primary Examiner.*

99—283

U.S. Cl. X.R.